US006651442B2

(12) United States Patent
Davies et al.

(10) Patent No.: US 6,651,442 B2
(45) Date of Patent: Nov. 25, 2003

(54) APPARATUS AND METHOD FOR DETERMINING THE STATUS OF A VALVE ARRANGEMENT FORMING PART OF A FUELLING SYSTEM

(75) Inventors: Roland Douglas Davies, Solihull (GB); Trevor Stanley Smith, Sutton Coldfield (GB)

(73) Assignee: Goodrich Control Systems Limited (GB)

( * ) Notice: Subject to any disclaimer, the term of this patent is extended or adjusted under 35 U.S.C. 154(b) by 49 days.

(21) Appl. No.: 09/853,267
(22) Filed: May 11, 2001
(65) Prior Publication Data
US 2002/0007820 A1 Jan. 24, 2002

(30) Foreign Application Priority Data

May 12, 2000 (GB) .............................................. 0011345
Feb. 9, 2001 (GB) .............................................. 0103342

(51) Int. Cl.[7] ................................................ F02C 9/26
(52) U.S. Cl. ...................................... 60/773; 60/39.281
(58) Field of Search .............................. 60/39.281, 773, 60/39.091, 779

(56) References Cited

U.S. PATENT DOCUMENTS 5,448,882 A * 9/1995 Dyer et al. ............... 60/39.281
6,321,527 B1 * 11/2001 Dyer et al. ............... 60/39.281

* cited by examiner

Primary Examiner—Louis J. Casaregola
(74) Attorney, Agent, or Firm—Michael Best & Friedrich LLP (57) ABSTRACT

An apparatus for determining the statues of a shut-off valve arrangement forming part of a fuelling system of an engine comprises a metering valve arrangement comprising a metering valve member for regulating fuel flow from a pump to the engine and a position sensor for monitoring the position of the metering valve member. The shut-off valve arrangement is operable between open and closed positions and the metering valve arrangement is operable between a maximum flow position, in which the flow of fuel through the metering valve arrangement to the shut-off valve arrangement is a maximum, and a minimum flow position in which the flow of fuel through the metering valve arrangement to the shut-off valve arrangement is a minimum. The position of the metering valve member is controlled by controlling fuel pressure acting on the metering valve member. The apparatus further comprises a first arrangement for varying fuel pressure acting on the metering valve member upon closure of the shut-off valve arrangement, and a second arrangement for monitoring the response of the metering valve arrangement to the variation in fuel pressure applied to the metering valve member so as to provide an indication that the shut-off valve arrangement has closed The invention also relates to a method of determining the status of a valve arrangement forming part of a fuelling system.

25 Claims, 3 Drawing Sheets

APPARATUS AND METHOD FOR DETERMINING THE STATUS OF A VALVE ARRANGEMENT FORMING PART OF A FUELLING SYSTEM

The invention relates to an apparatus for determining the status of a valve arrangement forming part of a fuelling system. In particular, the invention relates to an apparatus for monitoring the status of a pressure raising shut-off valve arrangement forming part of a fuelling system for an aircraft engine. The invention also relates to a method for determining the status of such a valve arrangement.

In a conventional fuelling system for an aircraft engine, a plump receives fuel at relatively low pressure through an inlet passage, the pump being driven by means of a drive shaft associated with the engine. The pump delivers fuel through a pump outlet to a metering valve arrangement and a pressure raising shut-off valve arrangement (PRSOV) which serve to regulate fuel flow to the engine. The metering valve and the pressure raising shut-off valve are responsive to signals from an electronic control circuit which, in turn, is responsive to signals from the engine and the metering valve arrangement. The provision of the pressure raising shut-off valve ensures fuel is only supplied to the engine when feel flow through the valve is of sufficiently high pressure.

Fuel flow to the engine can be modulated by moving the metering valve between a maximum flow and a minimum flow position. The pressure raising shut-off valve can be closed at any time, on demand, if it is required to shut-off the fuel supply to the engine. This may occur as a result of normal engine operation or as an emergency shut-off in the event of the occurrence of a fault, for example overspeed or fire.

For safety reasons, it is necessary to ascertain whether the pressure raising shut-off valve will close correctly upon shut-down of the engine. One step in the engine start-up procedure is therefore to check whether the pressure raising shut-off valve will close correctly during operation of the engine if normal or emergency shut-off is demanded. If a fault is detected, the subsequent engine start-up procedure is not initiated.

It is known to use microswitches to monitor the position of the shut-off valve so as to determine whether the valve will close correctly during the engine shut-down procedure and during the engine start-up procedures. When the pressure raising shut-off valve is moved to its closed position, the microswitches are closed to make an electrical connection, the absence of any resulting electrical signal indicating that closure of the shut-off valve did not occur correctly. The operation of the microswitches can, however, be unreliable. Another proposed solution is to use an inductive sensor in place of the microswitches. However, such solutions require additional wiring to be incorporated on the shut-off valve and within the electronic control unit. Furthermore, inductive sensors are relatively expensive components.

It is an object of the present invention to provide an apparatus and method for monitoring the position of a shut-off valve arrangement forming part of a fuelling system which alleviates or overcomes one or more of the aforementioned problems.

According to a first aspect of the present invention, an apparatus for determining the status of a shut-off valve arrangement forming part of a fuelling system of an engine comprises;

a metering valve arrangement comprising a metering valve member for regulating fuel flow from a pump to the engine and means for monitoring the position of the metering valve member, the metering valve member being operable between a maximum flow position in which a maximum flow of fuel flows through the metering valve arrangement to the shut-off valve arrangement, and a minimum flow position in which a minimum flow of fuel flows through the metering valve arrangement to the shut-off valve arrangement, means for varying fuel pressure acting on the metering valve member upon closure of the shut-off valve arrangement, and means for monitoring the response of the metering valve arrangement to the variation in fuel pressure so as to provide an indication that the shut-off valve arrangement has closed.

The invention provides the advantage that the need for microswitches or an inductive sensor for measuring the position of a shut-off valve member forming part of the shut-off valve arrangement is removed.

Conveniently, the metering valve arrangement includes first and second control chambers associated with respective ends of the metering valve member, the position of the metering valve member being controlled by controlling fuel pressure within at least one of the first and second control chambers.

Fuel pressure within the first and second control chambers may be controlled by means of a servo-valve supplied with a current.

The current supplied to the servo-valve is conveniently controlled by means of an electronic engine controller, the current being supplied by any suitable current source.

The position sensing means conveniently takes the form of an LVDT. The LVDT enables the position of the metering valve member to be accurately measured.

In one embodiment of the invention, the apparatus comprises means for reducing fuel pressure acting on one end of the metering valve member upon closure of the shut-off valve arrangement. For examples the shut-off valve arrangement may be adapted to include a porting arrangement arranged such that, upon closure of the shut-off valve arrangement, fuel pressure within one of the first and second control chambers is caused to be reduced. In one embodiment, the shut-off valve arrangement may be provided with a port in communication with a low pressure reservoir, the port being brought into communication with one of the first or second control chambers associated with the metering valve member upon closure of the shut-off valve arrangement.

Upon closure of the shut-off valve arrangement, there is a reduction in fuel pressure acting on one end of the metering valve member which serves to urge the metering valve member towards the minimum flow position. The electronic metering valve position control loop senses the change in position of the metering valve member and increases the electrical current supplied to the servo-valve, thereby decreasing the pressure of fuel acting on the other end of the metering valve member to oppose the movement towards the minimum flow position.

The relative sizes of the additional port on the shut-off valve arrangement and a port on the servo-valve may be arranged such it either (i) the metering valve member continues to move towards the minimum flow position or (ii) the metering valve is prevented from moving towards the minimum flow position. In case (i), movement of the metering valve member is sensed by the position sensing means which generates an output signal which provides an indication that closure of the shut-off arrangement has occurred correctly. In case (ii), an increase in the current supplied to the servo-valve is detected within the electronic control loop and is used to provide an indication that closure of the shut-off valve arrangement has occurred correctly.

In an alternative embodiment of the invention, the apparatus comprises means for increasing fuel pressure acting on one end of the metering valve member upon closure of the shut-off valve arrangement. For example, the shut-off valve arrangement may be adapted to include a porting arrangement such that, upon its closure, fuel pressure acting on one end of the metering valve member is increased.

In one embodiment, the shut-off valve arrangement may be provided with a port in communication with a source of high pressure fuel, as opposed to a low pressure fuel reservoir, the port being brought into communication with one of the first or second control chambers associated with the metering valve member upon closure of the shut-off valve arrangement.

The invention may also provide the further advantage that existing fuelling systems can be adapted relatively easily by providing two additional ports on the shut-off valve arrangement without the need for additional wiring on the shut-off valve arrangement and within the electronic engine controller.

Alternatively, the shut-off valve arrangement may include a pressure control chamber, fuel pressure within the pressure control chamber being varied so as to control the position of the shut-off valve member, whereby an increase in fuel pressure within the pressure control chamber causes closure of the shut-off valve arrangement. Preferably, the shut-off valve arrangement is provided with a fiber port in communication with the first control chamber of the metering valve arrangement, the further port being arranged such that, upon closure of the shut-off valve arrangement, the finder port is brought into communication with the pressure control chamber, thereby causing fuel at relatively high pressure to be delivered to the fist control chamber so as to urge the metering valve member towards the minimum flow position.

When it is desired to close the shut-off valve arrangement, fuel pressure within the pressure control chamber thereof is increased. Upon movement of the shut-off valve member towards its closed position, the further port is brought into communication with the pressure control chamber and, hence, high pressure fuel within the pressure control chamber is delivered to the first control chamber of the metering valve arrangement, thereby serving to urge the metering valve member towards the minimum flow position.

This embodiment of the invention provides the further advantage that, during normal operation when the shut-off valve arrangement is open, leakage of fuel to low pressure through the shut-off valve a arrangement can be substantially avoided.

The metering valve arrangement may alternatively include a third control chamber arranged such that, upon closure of the shut-off valve arrangement, fuel pressure within the third control chamber is increased, a force due to increased fuel pressure within the third control chamber acting in combination with a force due to fuel pressure within the first control chamber to urge the metering valve member towards the minimum flow position.

In this embodiment of the invention, the pressure of fuel within the third control chamber is not controlled by the servo-valve. This embodiment of the invention therefore provides the advantage that any problems which may arise during normal metering of the fuel system due to the provision of an additional port on the shut-off valve arrangement in communication with a chamber of the metering valve member, the pressure within which is controlled by the servo-valve, is avoided, as the port on the shut-off valve arrangement communicates with the third control chamber.

The shut-off valve arrangement preferably includes a shut-off valve member provided with an annular chamber defined, at least in part, by a recess or groove provided on the shut-off valve member, whereby the annular chamber communicates with the third control chamber depending on the position of the shut-off valve member, thereby permitting fuel at high pressure to flow into the third control chamber so as to urge the metering valve member towards the minimize flow position upon closure of the shut-off valve arrangement.

The metering valve member may conveniently be provided with a restricted drilling which permits fuel to flow from the third control chamber to a low pressure fuel reservoir at a relatively low rate.

As described previously, in embodiments of the invention in which fuel pressure applied to the metering valve member is varied upon closure of the shut-off valve arrangement, the position of the metering valve member may be monitored by the position sensing means so as to monitor the response of the metering valve arrangement to the variation in fuel pressure applied thereto.

As the metering valve member is urged towards its minimum flow position, the electronic controller provides a signal which tends to increase the current supplied to the servo-valve so as cause the metering valve member to be maintained in a demanded metering position.

In any of the embodiments of the invention, the apparatus may be arranged such that the metering valve member does move to its minimum flow position upon closure of the shut-off valve arrangement. In this case, the current supplied to the servo-valve must therefore be limited such that it does not exceed a predetermined limit. The current may conveniently be limited by appropriate programming of the electronic engine controller.

The apparatus may therefore comprise means for determining whether an output signal generated by the position sensing means which is indicative of movement of file metering valve member to the minimum flow position is accompanied by a command signal to initiate movement of the metering valve member to the minimum flow position and, in the event that it is not, for generating a filer output signal to provide an indication that closure of the shut-off valve arrangement has occurred.

Alternatively, the apparatus may comprise means for determining whether an output signal generated by the position sensing means indicative of movement of the metering valve member into the minimum flow position is accompanied by a command signal to initiate closure of the shut-off valve arrangement and for generating a further output signal to provide an indication that closure of the shut-off valve arrangement has occurred correctly.

Alternatively, in any of the embodiments of the invention, the response of the metering valve arrangement to the variation in fuel pressure may be monitored by measuring the current supplied to the servo-valve to maintain the metering valve member in the demanded metering position. In this case, the current need not be limited.

The apparatus may therefore include means for measuring the current supplied to the servo-valve, whereby the current supplied to the servo-valve so as to maintain the metering valve member in the demanded metering position is measured to provide an indication of the status of the shut-off valve arrangement.

Means may be provided for generating a further output signal to provide an indication that closure of the shut-off valve arrangement has occurred in the event that the current measured by the current sensing means exceeds a predetermined amount, indicative of movement of the metering valve member towards the minimum flow position, and this is accompanied by a command signal to initiate closure of the shut-off valve arrangement.

Alternatively, the apparatus may comprise means for determining whether an output signal generated by the current measuring means which is indicative of movement of the metering valve member towards the minimum flow position is accompanied by a command signal to initiate movement of the metering valve member to the minimum flow position and, in the event that it is not, for generating a further output signal to provide an indication that closure of the shut-off valve arrangement has occurred.

According to a second aspect of the present invention, there is provided a method for determining the status of a shut-off valve arrangement forming part of a fuel system of an engine, the method comprising the steps of;

providing a metering valve arrangement for regulating fuel flow from a pump to the engine comprising a metering valve member and means for controlling the position of the metering valve member, the position of the metering valve member being controlled by controlling fuel pressure within a control chamber which acts on the metering valve member, varying fuel pressure acting on the metering valve member upon closure of be shut-off valve arrangement so as to urge the metering valve member towards a minimum flow position, and monitoring the response of the metering valve arrangement so as to provide an indication of the states of the shut-off valve arrangement.

Preferably, the method includes the step of increasing fuel pressure acting on the metering valve member to urge the metering valve member towards the minimum flow position.

Preferably, the method includes the step of controlling the position of the metering valve member by means of a servo-valve supplied with a current;

In one preferred embodiment, the method comprises the steps of;

limiting the current supplied to the servo-valve such that it cannot exceed a predetermined amount, thereby causing the metering valve member to move into the minimum flow position upon closure of the shut-off valve arrangement;

sensing the position of the metering valve member using position sensing means and generating an output signal indicative of the position of the metering valve member, and using the output signal from the position sensing means to provide an indication that closure of the shut-off valve arrangement has occurred.

The predetermined amount is less than the minimum current required to maintain the metering valve member in a maximum flow position when the shut-off valve arrangement has closed, the current supplied to the servo-valve causing the pressure applied to the metering valve control chamber to oppose the force due to fuel at high pressure urging the metering valve member towards the minimum flow position.

Alternatively, in another preferred embodiment of the invention, the method may include the steps of;

measuring the current supplied to the servo-valve and using the measured current to provide an indication of the status of the shut-off valve arrangement.

Preferably, the method may comprise the step of determining that the shut-off valve arrangement has closed when the measured current exceeds a predetermined amount.

The invention will now be described, by way of example only, with reference to the accompanying figures in which.

Figure 1:
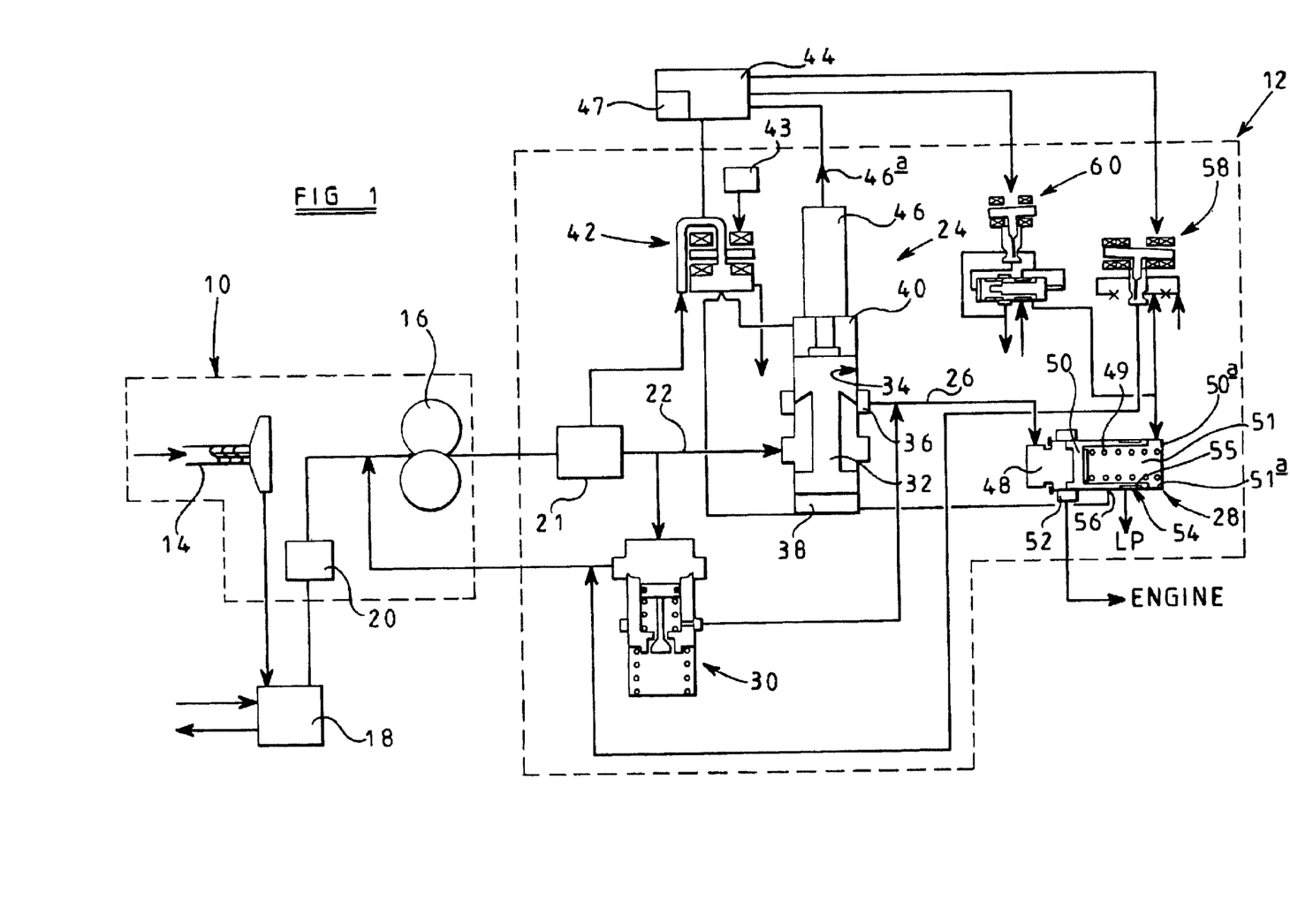
FIG. 1 shows a schematic diagram of a fuelling system for an aircraft engine in accordance with a first embodiment of the present invention.

Referring to FIG. 1, a fuelling system for an aircraft engine comprises a fuel pumping stage, referred to generally as 10, and a fuel metering and shut-off stage, referred to generally as 12. The pumping stage 10 comprises a boost pump 14 for delivering fuel to a gear pump 16. Fuel supplied from the boost pump 14 to the gear pump 16 is passed through heat exchanger means 18 and a filter 20. It will be appreciated that fuel pressure at the inlet of the pump 16 is relatively low and fuel pressure at the outlet of the pump 16 is relatively high, fuel pressure from the outlet of the pump 16 being supplied to an inlet of the fuel metering and shut-offstage 12 of the fuelling system.

The fuel metering and shut-off stage 12 of the fuelling system comprises a flow wash strainer 21 from which fuel is supplied, through an inlet passage 22, to a metering valve arrangement 24. The metering valve arrangement 24 delivers fuel through an outlet passage 26 to a pressure raising shut-off valve arrangement 28, the metering valve arrangement 24 and the pressure raising shut-off valve arrangement 28 serving to regulate fuel flow to the engine. The fuelling system also includes a pressure drop/spill valve arrangement 30 which is responsive to fuel pressure in the passage 22 and in the outlet passage 26 and serves to spill fuel from the passage 22 to the inlet of the gear pump 16 so as to maintain a substantially constant pressure drop across the metering valve arrangement 24.

The metering valve arrangement 24 includes a metering valve member 32, which conveniently takes the form of a piston, which is slidable within a bore 34 provided in a housing (not shown), for example a sleeve. The position of the metering valve member 32 is controlled by controlling fuel pressure within first and second control chambers 38, 40 respectively arranged at opposite ends of the metering valve member 32. The metering valve member 32 is moveable between a maximum flow position and a minimum flow position, the regulated flow through outlet port 36 of the metering valve arrangement 24 into the outlet passage 26 being determined by the position of the metering valve member 32. If fuel pressure within the fist control chamber 38 exceeds that within the second control chamber 40, a force is applied to the metering valve member 32 which serves to urge the valve member 32 towards the maximum flow position in which the rate of flow of fuel through the outlet port 36 into the outlet passage 26 is at a maximum level.

The metering valve arrangement 24 also includes a metering electro-hydraulic servo-valve 42 for controlling fuel pressure within the fast and second control chambers 38,40. The servo-valve 42 is responsive to signals from an electronic engine controller 44. In use, the electronic engine controller 44 supplies signals to the servo-valve 42 which serve to maintain the metering valve member 32 in a demanded flow position to ensure the demanded fuel flow is achieved. The operation of the metering electro-hydraulic servo-valve 42 would be familiar to a person skilled in the art.

The metering valve arrangement 24 also has an associated position sensor 46, for example an LVDT, for measuring the position of the metering valve member 32. The position sensor 46 provides an output signal 46a to the electronic engine controller 44 to provide an indication of the position of the metering valve member 32.

The pressure raising shut-off valve arrangement 28 includes a shut-off valve member 50, which conveniently takes the form of a piston, a surface associated with one end of the valve member 50 being exposed to fuel pressure within a shut-off valve chamber 48, the valve member 50 having, at its other end, a surface 50a which is exposed to a variable fuel pressure within a pressure control chamber 51. Fuel flows trough the outlet port 36, into the passage 26 and into the shut-off valve chamber 48. The pressure raising shut-off valve arrangement 28 also includes a spring 49 which acts on the shut-off valve member 50, the position of the shut-off valve member 50 being dependent upon fuel pressure within the shut-off valve chamber 48 and the combined force due to fuel pressure within the pressure control chamber 51 and the spring 49.

The pressure control chamber 51 includes a region 51a of enlarged diameter to which fuel is delivered under the control of the shut-off servo-valve 58 and the overspeed servo-valve 60. When the shut-off valve arrangement 28 is opened by the shut-off servo-valve 58 and the overspeed servo-valve 60, fuel within the pressure control chamber 51 is at a low pressure. The pressure of fuel within the chamber 48 overcomes the combined force acting on the opposite end 50a of the valve member 50, so that the shut-off valve arrangement opens to allow fuel supplied to the chamber 48 to flow through the outlet port 52 into the engine. The balance of forces acting on a the shut-off valve member 50 causes the opening position to vary, thereby varying the opening of the outlet port 52 so that fuel flow to the engine is throttled to maintain a minimum pressure in the shut-off valve chamber 48 relative to the pressure in the pressure control chamber 51. Upon movement of the valve member 50 to a closed position, the outlet port 52 is closed by the valve member 50 such that fuel within the shut-off valve chamber 48 is unable to flow through the outlet port 52 and the flow of fuel to the engine is terminated.

The pressure raising shut-off valve arrangement 28 also includes fist and second additional ports 54, 56 respectively, the fast port 54 being in communication with a low pressure fuel reservoir and the second port 56 being in communication with the first control chamber 38 associated with the metering valve arrangement 24. The valve member 50 is also provided with an annular chamber 55 arranged such that, upon closing movement of the valve member 50, the fist outlet port 54 communicates with the second outlet port 56 through the annular chamber 55, thereby permitting fuel within the first control chamber 38 to flow to low pressure.

Fuel pressure applied to the end surface 50a of the valve member 50 is controlled by means of a shut-off electrohydraulic servo-valve, referred to generally as 58, and an overspeed electrohydraulic servo-valve, referred to generally as 60. The shut-off servo-valve 58 and the overspeed servo-valve 60 are operable in response to usual operational and checking signals and signals generated in response to the occurrence of a cult condition in the fuelling system or the engine. For example, should a fire be detected, the shut-off servo-valve 58 is operated such that fuel pressure is applied to the end surface 50a of the valve member 50 which, together with the force due to the spring 49, is sufficient to overcome fuel pressure within the shut-off valve chamber 48 and serves to urge the shut-off valve member 50 to its closed position to terminate fuel flow through the outlet port 52 to the engine. The overspeed electro-hydraulic servo-valve 60 provides a similar function such that, in the event of engine overspeed, the valve member 50 is moved to the closed position to terminate fuel flow to the engine. It will be appreciated that the construction and operation of the shut-off electro-hydraulic servo-valve 58 and of the overspeed electro-hydraulic servo-valve 60 would be familiar to a person skilled in the art.

In operation, upon engine start-up, the metering valve member 32 is moved to a demanded metering position and the valve member 50 of the shut-off valve arrangement 28 is moved to its open position (as shown in the accompanying figure) to permit high pressure fuel from the pump 16 to flow through the metering valve arrangement 24, through the pressure raising shut-off valve arrangement 28 to the engine. When in the open position, the annular chamber 55 communicates with the outlet port 54, but does not communicate with the outlet port 56.

Upon engine shut-down, the valve member 50 of the shut-off valve arrangement 28 is moved to a closed position, either in response to operation of the shut-off servo-valve 58 or the overspeed servo-valve 60. Upon closing movement of the valve member 50, the annular chamber 55 moves into communication with the outlet port 56 so as to permit communication between the outlet port 54 and the outlet port 56. It will therefore be appreciated that fuel within the first control chamber 38 is able to flow into the annular chamber 55 and through the outlet port 54 to low pressure. This causes a reduction in fuel pressure acting on the associated end of the metering valve member 32 and, as fuel pressure within the second control chamber 40 is maintained, the metering valve member 32 is therefore urged towards a minimum flow position.

The position sensor 46 supplies an output signal 46a indicative of such closure of the metering valve member 32 to the electronic engine controller 44. In the event that the signal 46a indicative of closure of the metering valve arrangement 24 is accompanied by a closing command signal to initiate closure of the shut-off valve arrangement, it can therefore be deduced that closure of the metering valve member 32 has been caused by closure of the pressure raising shut-off valve 28. Manipulation of the command signals to the metering valve arrangement 24 and of the position output signal 46a, in software, therefore enables a determination of the status of the shut-off valve 28 to be made. In the event that closure of the shut-off valve 28 is detected, the subsequent engine start-up procedures can be initiated. In the event that closure of the shut-off valve arrangement 28 is not detected, appropriate action can be taken prior to initiation of the subsequent engine start-up procedures.

During the engine starting sequence, the overspeed electro-hydraulic servo-valve 60 will be operated as part of a total system check procedure to verify that correct operation of the system will be available if required in failure conditions. The correct operation of the system is confirmed by temporary closure of the pressure raising and shut-off valve arrangement 28 which serves to cause closure of the metering valve member 32. The closure of the metering valve member 32 can be detected, in software, as described previously.

In an alternative embodiment of the invention (not shown) to that described previously, the additional port 54 on the pressure raising shut-off valve 28 is not brought into direct communication with the metering valve chamber 38 when the pressure raising shut-off valve 28 is closed. Instead, the communication between the additional port 56 and the low pressure reservoir, via the port 54, serves to operate a hydraulic relay valve, the relay valve being provided with ports which communicate with the first control chamber 38 and a low pressure fuel reservoir respectively. In use, upon closure of the pressure raising shut-off valve arrangement 28, the relay valve is caused to change state and the first control chamber 38 is therefore brought into communication with the low pressure fuel reservoir.

Operation of this embodiment of the invention is substantially the same as described previously. However, as communication between the first control chamber 38 and the low pressure fuel reservoir is by means of a relay valve having a relatively small diameter, fuel leakage from the first control chamber 38 during normal operating conditions (when the hydraulic relay valve isolates the chamber 38 from low pressure) can be reduced by arranging that in the isolation position, the relay valve gives a better seal than the ports on the shut-off valve member 50.

The invention provides the advantage that the need for microswitches or inductive sensors to monitor the position of the valve member 50 of the pressure raising shut-off valve arrangement 28 is removed. Additionally, the pressure raising and shut-off valve in existing fuelling systems can easily be adapted by providing the second and third outlet ports 54,56 on the shut-off valve arrangement 28. The method also avoids any possibility of undetected sensor failures, as can occur when using microswitches, as the position of the metering valve member 32 is monitored constantly by the position sensor 46.

An alternative method of detecting the operation of the shut-off valve arrangement 28 involves the monitoring of the drive current supplied to the servo-valve 42. Any change in pressure which tends to displace the metering valve member from its demanded metering position will be opposed by the closed loop electrical control which will vary the drive event supplied to the servo-valve 42. Any significant increase in the servo-valve drive current which is accompanied by a command signal to close the shut-off valve arrangement 28 provides an indication that the shut-off valve arrangement 28 is functioning correctly.

Figure 2:
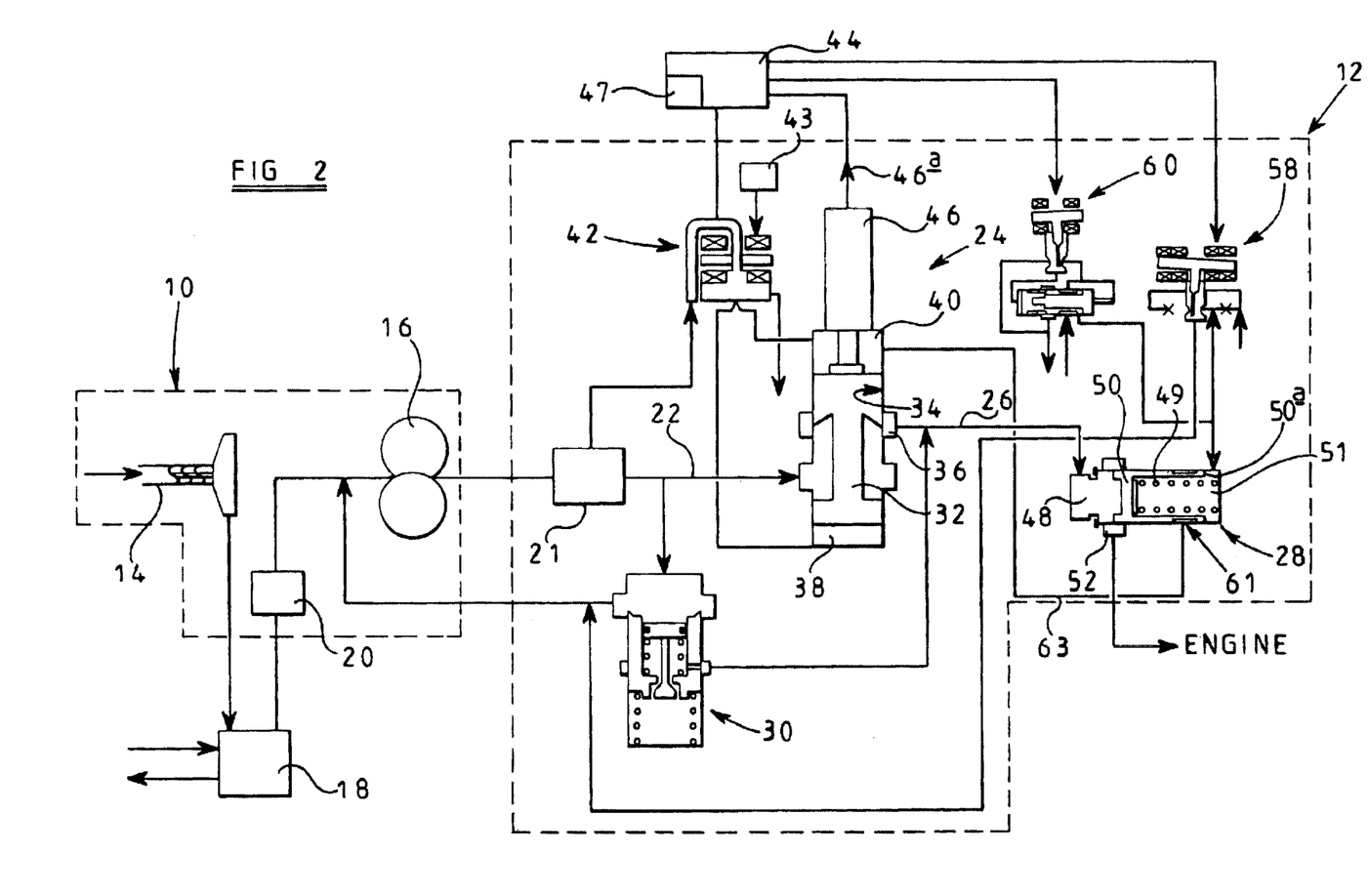
FIG. 2 shows a schematic diagram of a part of an alternative embodiment of the present invention.

One potential problem with the aforementioned arrangement is that, during normal metering of the fuelling system when the shut-off valve arrangement 28 is open, there may be undesirable leakage of fuel through the low pressure port 54. FIG. 2 shows an embodiment of the invention which overcomes this potential problem. In FIG. 2, similar parts to those shown in FIG. 1 are denoted with like reference numerals.

In the embodiment shown in FIG. 2, instead of providing the shut-off valve arrangement 28 with the first and second ports 54, 56 shown in FIG. 1, the shut-off valve arrangement 28 is provided with a further port 61 in communication with one end of a flow passage 63, the other end of the flow passage 63 communicating with the second control chamber 40 of the metering valve arrangement 24. As described previously, fuel pressure applied to the end face 50a of the shut-off valve member 50 is controlled by means of the shut-off electro-hydraulic servo-valve 58 and the overspeed electro-hydraulic servo-valve 60 so as to control the position of the shut-off valve member 50 and, hence, the status of the shut-off valve arrangement 28.

Upon engine shut-down, either in response to operation of the shut-off servo-valve 58 or the overspeed servo-valve 60, fuel pressure within the pressure control chamber 51 is increased such that the force applied to the shut-off valve member 50 by means of said fuel pressure, in combination with the force due to the spring 49, is sufficient to urge the shut-off valve member 50 towards its closed position to terminate fuel flow through the outlet port 52 to the engine. The further port 61 provided on the shut-off valve arrangement 28 is arranged such that, when the shut-off valve member 50 is moved to its closed position, the enlarged diameter region 51a of the pressure control chamber 51 is brought into communication with the further port 61, thereby permitting high pressure fuel within the pressure control chamber 51 to flow through the flow passage 63 to the second control chamber 40 associated with the metering valve arrangement 24.

As fuel pressure within the second control chamber 40 is increased, the force acting on the metering valve member 32 urging the metering valve member 32 towards its minimum flow position is increased. As the metering valve member 32 is urged towards its minimum flow position, tie servo-valve 42 is operated so as to maintain the metering valve member 32 in the position required to give the demanded fuel flow rate and, hence, the current supplied to the servo-valve 42 is increased. If the current supplied to the servo-valve 42 is limited such that it cannot exceed a pre-determined amount, the amount by which the pressure of fuel within the first control chamber 38 is increased, to oppose closing movement of the metering valve member 32, will be limited. Thus, a point will be reached at which the increased force acting on the metering valve member 32 due to increased fuel pressure within the second control chamber 40 is sufficient to overcome the fuel pressure within the first control chamber 38 and the metering valve member 32 will be urged closed. The current supplied to the servo-valve 42 to ensure the metering valve member 32 closes under such circumstances is limited to an appropriate predetermined amount.

The position sensor 46 supplies an output signal indicative of closure of the metering valve member 32 to the electronic engine controller 44. In the event that the signal indicative of closure of the metering valve member 32 is accompanied by a closing command signal being supplied from the electronic engine controller 44 to the shut-off valve arrangement 28, it can therefore be deduced that closure of the metering valve member 32 has been caused by closure of the pressure raising shut-off valve 28.

Manipulation of the command signals to the shut-off valve arrangement 28 and of the position output signal from the position sensor 46 in software enables a determination of the status of the shut-off valve arrangement 28 to be made.

The apparatus in FIG. 2 may be operated in a different manner such that the metering valve member 32 is not permitted to move into the minimum flow position upon an increase in fuel pressure within the second control chamber 40. Instead, the current supplied to the servo-valve 42 is not limited such that, when high pressure fuel from the pressure control chamber 51 flows through the flow passage 63 into the second control chamber 40 upon closure of the shut-off valve arrangement 28, the metering valve member 32 is maintained in the position required to give the demanded fuel flow rate by means of the servo-valve 42. Thus, upon closure of the shut-off valve arrangement 28, movement of the metering valve member 32 towards its minimum flow position will be opposed by the increased current supplied to the servo-valve 42, tending to increase fuel pressure within the first control chamber 38 and thereby maintaining the metering valve member 32 in its demanded flow position.

The current supplied to the servo-valve 42 which is measured by the current sensing means 47 can be used to provide an indication that the shut-off valve arrangement 28 has closed. When it is sensed that the current supplied to the servo-valve 42 is increased beyond a predetermined amount, thereby preventing the metering valve member 32 being moved towards its minimum flow position, it can be deduced that the shut-off valve arrangement 28 has closed, provided the increase in the measured current is accompanied by a command signal to the shut-off servo-valve 58 or the overspeed servo-valve 60 to close the shut-off valve arrangement 28. Thus it is possible to determine whether the shut-off valve arrangement 28 has closed. The electronic engine controller may be programmed to generate a further output signal to provide an indication that closure of the shut-off valve arrangement 28 has occurred.

The embodiment shown in FIG. 2 provides an advantage over that shown in FIG. 1 in that, during normal metering of the fuelling system when the shut-off valve arrangement 28 is open, undesirable leakage of fuel through the shut-off valve arrangement 28 to low pressure is avoided as the need for the low pressure port 54 is removed.

Figure 3:
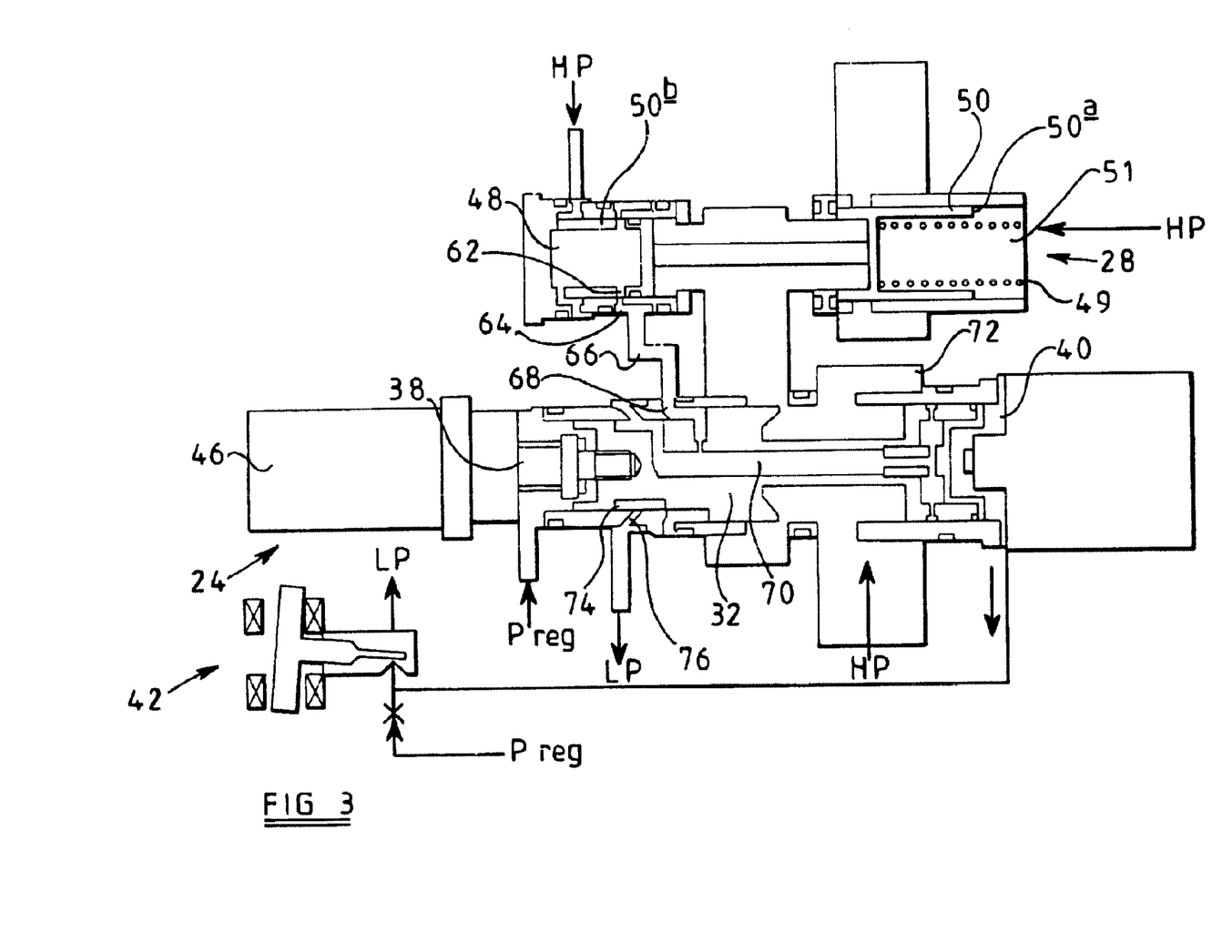
FIG. 3 shows a schematic diagram of a further alternative embodiment of the present invention.

FIG. 3 shows a further alternative embodiment of the invention, in which similar parts to those shown in FIGS. 1 and 2 are denoted with like reference numerals and will not be described in detail hereinafter. Referring to FIG. 3, the shut-off valve chamber 48 is supplied with fuel at high pressure from an appropriate part of the fuel system. The shut-off valve member 50 is in connection with a piston member 50b, a surface of the piston member 50b being exposed to pressure fuel within the shut-off valve chamber 48. Fuel at high pressure within the shut-off valve chamber 48 serves to urge the shut-off valve member 50 towards an open position. When fuel pressure within the pressure control chamber 51 is increased, the shut-off valve member 50 is urged towards its closed position by the spring 49 (as shown in FIG. 3). As described previously, the position of the shut-off valve member 50, and hence the piston member 50b, is controlled by means of a shut-off electro-hydraulic servo-valve or valves (not shown in FIG. 3) in response to usual operational and checking signals and signals generated in response to the occurrence of a fault condition in the fuelling system or the engine.

The metering valve member 32 takes the form of a differential area valve member, the position of which is controlled by controlling fuel pressure within the second control chamber 40 by means of an electro-hydraulic servo-valve 42. In the embodiment shown in FIG. 3, the position of the metering valve member 32 is controlled in a different manner to that described previously as the first control chamber 38 is supplied with a regulated flow of fuel ($P_{REG}$) such that fuel pressure within the first control chamber 38 remains substantially constant. The position of the metering valve member 32 is therefore controlled only by varying the pressure of fuel within the second control chamber 40 by means of the servo-valve 42.

The metering valve member 32 is shaped to define a third control chamber 68 in communication with the flow passage 66 such that, in use, the pressure of fuel within the third control chamber 68 acts in combination with the pressure of fuel within the first control chamber 38 against the force due to fuel pressure within the second control chamber 40, thereby serving to urge the metering valve member 32 towards the closed position.

The piston member 50b is provided with a first drilling 62, one end of which communicates with the shut-off valve chamber 48. When the shut-off valve member is in its closed positions the other end of the drilling 62 communicates with an annular chamber 64 defined, in part, by an annular recess or groove provided on the outer surface of the piston member 50b. The annular chamber 64 communicates with the flow passage 66 for fuel such that, in use, depending on the position of the shut-off valve member 50, fuel within the shut-off valve chamber 48 is able to flow through the drilling 62, into the annular chamber 64 and through the flow passage 66 into the third control chamber 68. The metering valve member 32 is also provided with an axially extending drilling 70 in communication with low pressure via an annular area 74 and a drilling 76. The axially extending drilling 70 communicates with the third control chamber 68 by means of a restricted drilling 72. The provision of the restricted drilling 72 permits a high proportion of high fuel pressure within the shut-off valve chamber 48 to be delivered to the third control chamber 68. The fuel pressure in the third control chamber 68 in such circumstances is determined by the relative diameters of the first drilling 62 and the restricted drilling 72.

In operation, upon engine start-up, the metering valve member 32 is moved to the required metering position and the shut-off valve member 50 is moved to its open position to permit high pressure fuel from the pump to flow through the metering valve arrangement 24 and through the pressure raising shut-off valve arrangement 28 to the engine, as described previously. When the shut-off valve arrangement 28 is in the open position, the first drilling 62 does not communicate with the annular chamber 64 such that high pressure fuel is unable to flow from the shut-off valve chamber 48 into the third control chamber 68 associated with the metering valve arrangement 24. The pressure of fuel within the third control chamber 68 is therefore relatively low, due to the supply of fuel from the drilling 70 via the restrictor 72. During this stage of operation, the metering valve member 32 is maintained in the position required to provide the demanded fuel flow rate by means of the servo-valve 42, the servo-valve 42 being operable in response to a control signal from the electronic engine controller 44, as described previously.

Upon engine shut-down, the shut-off valve member 50 is moved to a closed position, either in response to operation of the shut-off servo-valve 58 or the overspeed servo-valve 60 (neither shown in FIG. 3). Upon closing movement of the valve member 50 and the piston member 50b, the drilling 62 is brought into communication with the annular chamber 64 such that high pressure fuel within the shut-off valve chamber 48 is able to flow through the drilling 62, into the annular chamber 64 and through the flow passage 66 into the third control chamber 68. As fuel pressure within the third control chamber 68 is increased, the force acting on the metering valve member 32 urging the metering valve member 32 towards its closed position is increased, the force due to fuel pressure within the third control chamber 68 acting in combination with the force due to fuel pressure within the first control chamber 38.

As the metering valve member 32 is urged towards its closed position, the servo-valve 42 is operated so as to maintain the metering valve member 32 in the position required to give the demanded fuel flow rate and, hence, the current supplied to the servo-valve 42 is increased. If the current supplied to the servo-valve 42 is limited such that it cannot exceed a pre-determined amount, the amount by which the pressure of fuel within the second control chamber 40 is increased, to oppose closing movement of the metering valve member 32, will be limited. Thus, a point will be reached at which the increased force acting on the metering valve member 32 due to increased fuel pressure within the third control chamber 68, in combination with the force due to fuel pressure within the first control chamber 38, is sufficient to overcome the fuel pressure within the second control chamber 40 and the metering valve member 32 will be urged closed. The current supplied to the servo-valve 42 to ensure the metering valve member 32 closes under such circumstances is limited to an appropriate predetermined amount.

The position sensor 46 supplies an output signal indicative of closure of the metering valve member 32 to the electronic engine controller (not shown in FIG. 3). In the event that the signal indicative of closure of the metering valve member 32 is accompanied by a closing command signal being supplied from the electronic engine controller 44 to the shut-off valve arrangement 28, it can therefore be deduced that closure of the metering valve member 32 has been caused by closure of the pressure raising shut-off valve 28.

Manipulation of the command signals to the shut-off valve arrangement 28 and of the position output signal from the position sensor 46 in software enables a determination of the status of the shut-off valve arrangement 28 to be made.

In an alternative embodiment of the invention, the apparatus in FIG. 3 may be operated in a different manner such that the metering valve member 32 is not permitted to move into the minimum flow position upon closure of the shut-off valve arrangement 28. In this embodiment, the current supplied to the servo-valve 42 is not limited such that, when high pressure fuel from the shut-off valve chamber 48 flows into the third control chamber 68 upon closure of the shut-off valve arrangement 28, the metering valve member 32 is maintained in the position required to give the demanded fuel flow rate by means of the servo-valve 42. Upon closure of the shut-off valve 28, the metering valve member 32 will be urged towards its minimum flow position due to increased fuel pressure within the third control chamber 68, but such movement will be opposed by the increased current supplied to the servo-valve 42, tending to increase fuel pressure within the second control chamber 40 and thereby maintaining the metering valve member 32 in its demanded flow position. The current supplied to the servo-valve 42 is measured using a current sensing means 47 forming part of the controller 44 and the measured current can be used to provide an indication that the shut-off valve arrangement 28 has closed.

When it is sensed that the current supplied to the servo-valve 42 is increased beyond a predetermined amount, thereby preventing the metering valve member being moved towards its minimum flow position, it can be deduced that the shut-off valve arrangement 28 has closed, provided the increase in the measured current is accompanied by a command signal to the shut-off servo-valve 58 or the overspeed servo-valve 60 to close the shut-off valve arrangement 28. Thus it is possible to determine whether the shut-off valve arrangement 28 has closed. The electronic engine controller may be programmed to generate a further output signal to provide an indication that closure of the shut-off valve arrangement 28 has occurred.

The embodiment of the invention shown in FIG. 3 provides an advantage over that shown in FIG. 1 in that the need for the ports on the shut-off valve arrangement 28 to be connected to a chamber, the pressure within which is controlled by the servo-valve 42, is avoided. Thus, any problems which may arise during normal metering of the fuelling system due to leakage via the ports on the shut-off valve arrangement 28 are avoided.

It will be appreciated that an alternative arrangement of connections between the first control chamber 38 and the shut-off valve arrangement 28 may cause low pressure to be applied to the first control chamber 38, resulting in movement of the metering valve member 32 towards the maximum flow position, sensing of such movement, or the variation in the current supplied to the servo-valve to oppose such movement.

We claim:

1. An apparatus for determining the status of a shut-off valve arrangement forming part of a fuelling system of an engine, the shut-off valve arrangement being operable between open and closed positions, the apparatus comprising:
   a metering valve arrangement comprising a metering valve member for regulating fuel flow from a pump forming part of the fuelling system to the engine and position sensor for monitoring the position of the metering valve member;
   wherein the metering valve member is operable between a maximum flow position in which there is a maximum flow of fuel through the metering valve arrangement to the shut-off valve arrangement, and a minimum flow position in which there is a minimum flow of fuel through the metering valve arrangement to the shut-off valve arrangement, the position of the metering valve member being controlled by controlling fuel pressure acting on the metering valve member;
   a port for varying fuel pressure acting on the metering valve member upon closure of the shut-off valve arrangement; and
   a sensor for monitoring the response of the metering valve arrangement to the variation in fuel pressure applied to the metering valve member so as to provide an indication that the shut-off valve arrangement has closed.

2. A fuel system as claimed in claim 1, wherein the metering valve arrangement includes first and second control chambers associated with respective ends of the metering valve member, the position of the metering valve member being controlled by controlling fuel pressure within one or more of first and second control chambers.

3. A fuel system as claimed in claim 2, comprising a servo-valve supplied with a current for varying fuel pressure within at least of one the first and second control chambers.

4. A fuel system as claimed in claim 2, wherein the position sensor takes the form of an LVDT.

5. A fuel system as claimed in claim 2, wherein the first arrangement is adapted such that fuel pressure acting on the metering valve member is reduced upon closure of the shut-off valve arrangement.

6. A fuel system as claimed in claim 5, wherein the shut-off valve arrangement is provided with a port in communication with a low pressure reservoir, the port being brought into communication with one of the first or second control chambers upon closure of the shut-off valve arrangement so as to urge the metering valve member towards the minimum flow position, whereby the position of the metering valve member is monitored so as to provide an indication that closure of the shut-off valve arrangement has occurred.

7. A fuel system as claimed in claim 2, wherein said port increases the fuel pressure acting on the metering valve member in response to closure of the shut-off valve arrangement.

8. A fuel system as claimed in claim 7, wherein the shut-off valve arrangement is provided with a second port in communication with a high pressure reservoir, the second port being brought into communication with one of the first or second control chambers upon closure of the shut-off valve arrangement so as to urge the metering valve member towards the minimum flow position, whereby the position of the metering valve member is monitored so as to provide an indication that closure of the shut-off valve arrangement has occurred.

9. A fuel system as claimed in claim 7, wherein the metering valve arrangement includes a third control chamber arranged such that, upon closure of the shut-off valve arrangement, fuel pressure within the third control chamber is increased, a force due to increased fuel pressure within the third control chamber acting in combination with a force due to fuel pressure within the first control chamber to urge the metering valve member towards the minimum flow position.

10. A fuel system as claimed in claim 9, wherein the shut-off valve arrangement includes a shut-off valve member which is exposed to fuel pressure within a shut-off valve chamber, the shut-off valve member being movable between an open position in which fuel flow through the shut-off valve arrangement is permitted and a closed position in which fuel flow through the shut-off valve arrangement is prevented, wherein the port comprises a first drilling provided on the shut-off valve arrangement which, when the shut-off valve member is urged towards its closed position, permits communication between the shut-off valve chamber and the third control chamber associated with the metering valve arrangement, communication between the shut-off valve chamber and the third control chamber through the drilling being broken when the shut-off valve member is in its open position.

11. A fuel system as claimed in claim 9, wherein the metering valve member is provided with a restricted drilling which permits fuel flow between the third control chamber and a low pressure fuel reservoir at a relatively low rate.

12. A fuel system as claimed in claim 9, comprising a controller for limiting the current supplied to the servo-valve such that, upon closure of the shut-off valve arrangement, fuel pressure within the third control chamber is increased by an amount sufficient to urge the metering valve member towards the minimum flow position, and whereby the position of the metering valve member measured by the position sensor is used to provide an indication of the response of the metering valve arrangement to the variation in fuel pressure.

13. A fuel system as claimed in claim 7, wherein the shut-off valve arrangement includes a pressure control chamber, whereby an increase in fuel pressure within the pressure control chamber causes closure of the shut-off valve arrangement, the shut-off valve arrangement being provided with a second port in communication with the first control chamber of the metering valve arrangement, the second port being arranged such that, upon closure of the shut-off valve arrangement, the second port is brought into communication with the pressure control chamber, thereby causing fuel at relatively high pressure to be delivered to the first control chamber so as to urge the metering valve member towards the minimum flow position.

14. A fuel system as claimed in claim 13, comprising a controller for limiting the current supplied to the servo-valve such that, upon closure of the shut-off valve arrangement, fuel pressure within the first control chamber is increased by an amount sufficient to urge the metering valve member towards the minimum flow position, and whereby the position of the metering valve member measured by the position sensor is used to provide an indication of the response of the metering valve arrangement to the variation in fuel pressure.

15. A fuel system as claimed in claim 14, wherein the controller is arranged to determine whether an output signal generated by the position sensor which is indicative of movement of the metering valve member towards the minimum flow position is accompanied by a command signal to initiate movement of the metering valve member to the minimum flow position and, in the event that it is not, for generating a further output signal to provide an indication that closure of the shut-off valve arrangement has occurred.

16. A fuel system as claimed in claim 14, wherein the controller is arranged to determine whether an output signal generated by the position sensor which is indicative of movement of the metering valve member into the minimum flow position is accompanied by a command signal to initiate closure of the shut-off valve arrangement and for generating a further output signal to provide an indication that closure of the shut-off valve arrangement has occurred correctly.

17. A fuel system as claimed in claim 13, further comprising a current sensor for measuring the current supplied to the servo-valve.

18. A fuel system as claimed in claim 17, further comprising a controller for determining whether an output signal generated by the current sensor which is indicative of movement of the metering valve member towards the minimum flow position is accompanied by a command signal to initiate closure of the shut-off valve arrangement and for generating a further output signal to provide an indication that closure of the shut-off valve arrangement has occurred.

19. A fuel system as claimed in claim 17, further comprising a controller for determining whether an output signal generated by the current sensor which is indicative of movement of the metering valve member towards the minimum flow position is accompanied by a command signal to initiate movement of the metering valve member to the minimum flow position and, in the event that it is not, for generating a further output signal to provide an indication that closure of the shut-off valve arrangement has occurred.

20. A method for determining the status of a shut-off valve arrangement forming part of a fuel system of an engine comprising;
providing a metering valve arrangement for regulating fuel flow from a pump to the engine comprising a metering valve member and means for controlling the position of the metering valve member, the position of the metering valve member being controlled by controlling fuel pressure acting on the metering valve member;
varying via a port fuel pressure acting on the metering valve member upon closure of the shut-off valve arrangement so as to urge the metering valve member towards a minimum flow position; and
monitoring via a sensor the response of the metering valve arrangement so as to provide an indication of the status of the shut-off valve arrangement.

21. A method as claimed in claim 20, comprising increasing fuel pressure acting on the metering valve member upon closure of the shut-off valve arrangement.

22. A method as claimed in claim 21, comprising controlling the position of the metering valve member by means of a servo-valve supplied with a current.

23. A method as claimed in claim 22, comprising;
limiting the current supplied to the servo-valve such that it cannot exceed a predetermined amount, thereby causing the metering valve member to be moved into the minimum flow position upon closure of the shut-off valve arrangement;
sensing the position of the metering valve member using position sensor and generating an output signal indicative of the position of the metering valve member; and
using the output signal from the position sensor to provide an indication that closure of the shut-off valve arrangement has occurred.

24. A method as claimed in claim 22, comprising;
measuring the current supplied to the servo-valve; and
using the measured current to provide an indication of the status of the shut-off valve arrangement.

25. A method as claimed in claim 24, comprising determining that the shut-off valve arrangement has closed when the measured current exceeds a predetermined amount.

* * * * *